UNITED STATES PATENT OFFICE.

HENRY H. BUCKMAN, OF JACKSONVILLE, FLORIDA.

PIGMENT AND METHOD FOR PRODUCING SAME.

1,411,839. Specification of Letters Patent. Patented Apr. 4, 1922.

No Drawing. Application filed March 5, 1921. Serial No. 449,914.

*To all whom it may concern:*

Be it known that I, HENRY H. BUCKMAN, a resident of Jacksonville, Florida, being a citizen of the United States, have invented certain new and useful Improvements in Pigments and Methods for Producing Same, of which the following is a specification.

My present invention relates to composite pigments and has for its object the production of pigments of this class by simpler methods than any heretofore employed. My invention makes possible also a large number of new pigments not hitherto produced.

Composite pigments have been hitherto usually produced in one of two ways, i. e., by mechanically mixing a true pigment with an extender, or by precipitating from solution a true pigment on an extender. Examples of the first method are the mixing of barium sulphate, chalk, silica, and other finely ground substances, which of themselves have little or no pigmenting power, with a true pigment, such as white lead, solid, inorganic oxygen compounds of titanium, tin oxide, zinc oxide, etc. In these cases the composite pigment obtained has substantially only the pigmenting power of the true pigment diluted to the extent to which extender substance has been added. Examples of the second method are the coprecipitation of barium sulphate and zinc sulphide to form the so-called lithopone pigment; the coprecipitation of solid, inorganic oxygen compounds of titanium and barium sulphate, and the precipitation of solid, inorganic oxygen compounds of titanium on barium sulphate. In these cases, the pigmenting power does not necessarily depend on the amount of true pigment used, for often composite pigments of this class are produced which (although largely made up of materials having in themselves little or no pigmenting power) have a pigmenting power comparable with that of the true pigment. This is often explained by the theory that in pigments of the coprecipitated class, the particles of the several constituents of the composite pigment are not simply mechanically mixed, but are firmly adhering to each other by virtue of the conditions under which they were formed.

I have discovered that the effect of coprecipitated pigments can be obtained by a simpler and cheaper method, i. e., by sufficiently heating a mechanical mixture of pigment and extender until adherence or association of the particles is brought about by the heat. The temperature must be high enough to cause the cementing of the particles, but not high enough to cause actual fusion. Sometimes it is necessary to introduce a third substance in addition to the pigment and extender, this third substance to act as a binder in assisting to coherence of the particles when sufficiently heated.

In order to enable others to practice my invention, I shall give several examples, although my invention is not limited to or by these examples.

I take one part of white lead and two parts of calcium carbonate, and after adding water sufficient to make a paste, I mix thoroughly. This addition of water is not essential, but I prefer to use it in order to assist in getting a thorough mechanical mixture of the batch. I then take this mixture (which will have substantially simply the pigmenting power of white lead diluted in proportion to the calcium carbonate added) and heat it for two hours at a dull red heat. I then cool and finely grind the product. The ground product thus obtained will have a pigmenting power very much greater than that of the simple mixture before heating, and indeed, it will compare favorably with that of pure white lead. During the heating there will be some loss of weight, and some discoloration of the product. These may be controlled to a certain extent and reduced to a minimum by care and practice in the operation.

As another example, I take one part of titanium oxide (preferably freshly prepared, although I have used the old, ignited oxide successfully) and one part of barium sulphate and mix with water to a paste. This paste I bring to a red heat, or sufficient to heat-compact the particles of titanium oxide and barium sulphate. After cooling and grinding, the product will be found to have a pigmenting power very much greater than the simple mixture, and comparable with the pure titanium oxide. I have prepared corresponding pigments using titanium oxide and calcium carbonate, titanium oxide and calcium sulphate, titanium oxide and barium carbonate, titanium oxide and magnesium carbonate, titanium oxide and ground silica, and numerous others. By "titanium oxide" I mean a solid, inorganic oxygen compound of titanium, composed preponderantly of titanium and oxygen, whether or not carrying a certain minor portion of combined water, hydroxyl, hydrogen, sulphur or other elements.

As another example, I take tin oxide and calcium carbonate, in the proportion of one part of oxide to two parts of carbonate. Then I mix with water to a stiff paste and heat to a red heat, or sufficient to heat-compact the particles of tin oxide and calcium carbonate. I then cool and grind the product. This product has a very much greater pigmenting power than has a simple mechanical mixture of tin oxide and calcium carbonate. This mixture when heat-compacted after my process is particularly adapted as a pigment in enamels and glazes such as those used on sanitary ware and cooking utensils.

As another example, I take zinc oxide one part and calcium carbonate two parts, and mix with water to a paste. I then heat this paste to a red heat, or sufficient to heat-compact the particles of oxide and carbonate. I then cool and grind the product. This product has a very much greater pigmenting power than has the simple mixture before heating. I have also used with success zinc oxide and barium sulphate and zinc oxide and calcium sulphate.

The proportions given in the foregoing examples are not essential, and may be varied within very wide limits. The method of mixing is not essential. It is important, however, to obtain as perfect and uniform a mechanical mixture as possible before heating. In short, my invention or discovery may be stated as follows (in so far as the general method is concerned, and without reference to any particular new composite pigment which my method has made possible): In general, when a substance of the class commonly known as true pigments is mechanically mixed with a substance of the class commonly known as extenders, a simple mixture of "extended" pigment is produced, having pigmenting power substantially proportionate to the amount of true pigment used. But when such a mixture is heated, either by itself or mixed with some third material to act and assist as a binder, sufficiently to heat-compact the particles of the constituent substances, a true composite pigment is formed, which has a pigmenting power very much greater than the corresponding simple mechanical mixture. In the above examples where I have used calcium carbonate it might be thought that the increased pigmenting power of the heat-compacted composite pigment was due to the loss of carbon dioxide gas by the mixture, thus increasing mechanically or arithmetically the proportion of true pigment present. That this is not the case, or at least that it is the case only to a negligible extent is proven by several facts. First, the change in proportions caused by the amount of carbon dioxide given off is not nearly great enough to account for the increase in pigmenting power; second, the method may be successfully employed (so far as developing pigmenting power is concerned) by the use of calcium oxide to replace calcium carbonate; and third, calcium carbonate is only one of a great number of substances which may be employed in this method, and the majority of these substances do not suffer loss of weight on heating.

I have discovered that my above-described pigments can be used for paints, when mixed with proper vehicles, such as linseed oil; also that they combine well in paints with other pigments, especially white lead, zinc oxide, lithopone and titanium oxide pigments. I have also discovered that they may be successfully used in the manufacture of rubber, plastics, linoleums and printer's inks, and as fillers for paper and cloth.

Having now described my invention, what I claim as new and desire to secure by Letters Patent is the following:

1. Heat-compacting the particles of the several constituents of a mechanical mixture of pigment and extender to produce a composite pigment in the presence of a material to act as a binder and to assist in said heat-compacting of the particles.

2. In the production of composite titanium pigments, that step which comprises heat compacting the particles of the several constituents of a mechanical mixture of a solid, inorganic oxygen compound of titanium and extender.

3. In the production of composite titanium pigments the steps which comprise making an intimate mechanical mixture of water, a solid, inorganic oxygen compound of titanium and extender, and calcining the batch till coherence of the particles of the titanium compound with the particles of extender is produced by heat-compacting.

4. In the production of composite titanium pigments, the steps which comprise making an intimate mechanical mixture of water, a solid, inorganic oxygen compound of titanium and barium sulphate, and calcining the batch till coherence of the particles of titanium compound with the particles of barium sulphate is produced by heat-compacting.

5. In the production of composite titanium pigments, the steps which comprise making an intimate mechanical mixture of water, a solid, inorganic oxygen compound of titanium and barium sulphate and a material to act as a binder and aid to heat-compacting, and calcining the batch till coherence of the particles of the several constituents is produced by heat-compacting.

6. In the production of composite titanium pigments, the steps which comprise making an intimate mechanical mixture of a solid, inorganic oxygen compound of titanium and barium sulphate, and calcining the batch till coherence of the particles of the titanium compound with the particles of barium sulphate is produced by heat-compacting.

7. In the production of composite titanium pigments, the steps which comprise making an intimate mechanical mixture of a solid, inorganic oxygen compound of titanium and barium sulphate and a material to act as a binder and aid to heat-compacting, and calcining the batch till coherence of the particles of the several constituents is produced by heat-compacting.

8. As a new article, a composite pigment comprising heat-compacted particles of a mechanical mixture of a solid, inorganic oxygen compound of titanium and extender.

9. As a new article, a composite pigment comprising heat-compacted particles of a mechanical mixture of a solid, inorganic oxygen compound of titanium and extender and a binder and aid to heat-compacting.

10. As a new article, a composite pigment comprising heat-compacted particles of a mechanical mixture of a solid, inorganic oxygen compound of titanium and barium sulphate.

11. As a new article, a composite pigment comprising heat-compacted particles of a mechanical mixture of a solid, inorganic oxygen compound of titanium and barium sulphate and a binder and aid to heat-compacting.

HENRY H. BUCKMAN.